(12) United States Patent
Nakama et al.

(10) Patent No.: US 12,525,642 B2
(45) Date of Patent: Jan. 13, 2026

(54) POSITIVE ELECTRODE MATERIAL, AND BATTERY

(71) Applicant: Panasonic Intellectual Property Management Co., Ltd., Osaka (JP)

(72) Inventors: Yoshimasa Nakama, Osaka (JP); Masashi Sakaida, Hyogo (JP); Izuru Sasaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 672 days.

(21) Appl. No.: 17/902,599

(22) Filed: Sep. 2, 2022

(65) Prior Publication Data
US 2022/0416296 A1 Dec. 29, 2022

Related U.S. Application Data

(63) Continuation of application No. PCT/JP2021/010207, filed on Mar. 12, 2021.

(30) Foreign Application Priority Data

Mar. 18, 2020 (JP) .................. 2020-048461

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/505* (2013.01);
(Continued)

(58) Field of Classification Search
CPC .. H01M 10/0562; H01M 4/131; H01M 4/505; H01M 4/525; H01M 10/0568;
(Continued)

(56) References Cited

U.S. PATENT DOCUMENTS

2008/0044727 A1 2/2008 Suzuki et al.
2013/0071745 A1 3/2013 Mun et al.
(Continued)

FOREIGN PATENT DOCUMENTS

CN 108336328 A 7/2018
JP 2001-176510 A 6/2001
(Continued)

OTHER PUBLICATIONS

Asano et al. "Solid halide electrolytes with high lithium-ion conductivity in 4V class bulk-type all-solid-state batteries" (Year: 2018).*

(Continued)

*Primary Examiner* — Matthew T Martin
*Assistant Examiner* — Felicity B Alban
(74) *Attorney, Agent, or Firm* — Rimon P.C.

(57) ABSTRACT

A positive electrode material of the present disclosure includes: a positive electrode active material; and a first solid electrolyte material coating at least partially a surface of the positive electrode active material, wherein the first solid electrolyte material includes Li, Ti, M1, and F, and the M1 is at least one element selected from the group consisting of Ca, Mg, Al, Y, and Zr.

23 Claims, 2 Drawing Sheets

(51) Int. Cl.
  *H01M 4/505* (2010.01)
  *H01M 4/525* (2010.01)
  *H01M 10/0568* (2010.01)
  *H01M 4/02* (2006.01)

(52) U.S. Cl.
  CPC ....... *H01M 4/525* (2013.01); *H01M 10/0568* (2013.01); *H01M 2004/028* (2013.01); *H01M 2300/0025* (2013.01); *H01M 2300/008* (2013.01)

(58) Field of Classification Search
  CPC ... H01M 2004/028; H01M 2300/0025; H01M 2300/008
  See application file for complete search history.

(56) References Cited

U.S. PATENT DOCUMENTS

| | | | |
|---|---|---|---|
| 2016/0359166 A1* | 12/2016 | Han | H01M 4/366 |
| 2017/0309964 A1* | 10/2017 | Iwamoto | H01M 10/0565 |
| 2018/0205073 A1 | 7/2018 | Natsui et al. | |
| 2018/0351167 A1 | 12/2018 | Tojigamori et al. | |
| 2018/0358611 A1 | 12/2018 | Kimura et al. | |
| 2019/0341618 A1 | 11/2019 | Mane et al. | |
| 2020/0075993 A1* | 3/2020 | Ling | H01M 4/0404 |
| 2020/0251716 A1 | 8/2020 | Kawada et al. | |

FOREIGN PATENT DOCUMENTS

| | | |
|---|---|---|
| JP | 2006-244734 A | 9/2006 |
| JP | 2008-071750 A | 3/2008 |
| JP | 2017-107762 A | 6/2017 |
| JP | 2018-170099 A | 11/2018 |
| JP | 2018-206537 A | 12/2018 |
| KR | 10-2018-0033838 A | 4/2018 |
| WO | 2019/058702 A1 | 3/2019 |

OTHER PUBLICATIONS

Extended European Search Report dated Aug. 16, 2023 issued in the corresponding European Patent Application No. 21771068.0.
International Search Report issued on May 18, 2021 in International Patent Application No. PCT/JP2021/010207, with English translation.
1 Search Report received in corresponding Chinese Patent Application No. 202180016747.4, mailed Mar. 20, 2025.

* cited by examiner

POSITIVE ELECTRODE MATERIAL, AND BATTERY

This application is a continuation of PCT/JP2021/010207 filed on Mar. 12, 2021, which claims foreign priority of Japanese Patent Application No. 2020-048461 filed on Mar. 18, 2020, the entire contents of both of which are incorporated herein by reference.

BACKGROUND OF THE INVENTION

1. Field of the Invention

The present disclosure relates to a positive electrode material and a battery.

2. Description of Related Art

JP 2006-244734 A discloses a battery including, as a solid electrolyte, a compound containing indium as cations and a halogen element as anions. JP 2006-244734 A discloses that, as halogen elements contained in solid electrolytes, chlorine, bromine, and iodine are used, and in particular, chlorine and bromine are preferably used.

SUMMARY OF THE INVENTION

The present disclosure provides a positive electrode material that can suppress an increase in internal resistance of a battery during charge.

A positive electrode material of the present disclosure includes:
- a positive electrode active material; and
- a first solid electrolyte material coating at least partially a surface of the positive electrode active material, wherein
- the first solid electrolyte material includes Li, Ti, M1, and F, and
- the M1 is at least one element selected from the group consisting of Ca, Mg, Al, Y, and Zr.

The present disclosure provides a positive electrode material that can suppress an increase in internal resistance of a battery during charge.

DETAILED DESCRIPTION

Findings on which the Present Disclosure is Based

JP 2006-244734 A discloses an all-solid-state secondary battery including a solid electrolyte formed of a compound containing indium as cations and a halogen element as anions. JP 2006-244734 A makes the following reference; in this all-solid-state secondary battery, a positive electrode active material has a potential relative to Li of desirably 3.9 V or less on average, and this suppresses generation of a coating formed of a decomposition product resulting from oxidative decomposition of the solid electrolyte, thereby achieving favorable charge and discharge characteristics. JP 2006-244734 A also discloses, as positive electrode active materials having a potential relative to Li of 3.9 V or less on average, general layered transition metal oxides such as $LiCoO_2$ and $LiNi_{0.8}Co_{0.15}Al_{0.05}O_2$.

The present inventors made a study of the resistance of halide solid electrolytes to oxidative decomposition. Halide solid electrolytes are materials containing, as anions, a halogen element such as fluorine (i.e., F), chlorine (i.e., Cl), bromine (i.e., Br), and iodine (i.e., I). As a result of the study, the present inventors found the fact that the resistance of halide solid electrolytes to oxidative decomposition varies depending on the type of element contained as anions.

Specifically, it was found that, in a battery in which a positive electrode material includes a halide solid electrolyte containing at least one element selected from the group consisting of chlorine, bromine, and iodine, the halide solid electrolyte is oxidatively decomposed during charge even in the case where a positive electrode active material having a potential relative to Li of 3.9 V or less on average is used. Furthermore, the present inventors discovered a problem that the oxidative decomposition product functions as a resistance layer to increase the internal resistance of the battery during charge. The present inventors inferred that the cause is an oxidation reaction of the at least one element selected from the group consisting of chlorine, bromine, and iodine contained in the halide solid electrolyte. Here, the oxidation reaction refers to a side reaction that occurs in addition to a normal charge reaction in which lithium and electrons are extracted from the positive electrode active material included in the positive electrode material. In the side reaction, electrons are also extracted from the halide solid electrolyte containing the at least one element in contact with the positive electrode active material, which is selected from the group consisting of chlorine, bromine, and iodine. It is considered that, with this oxidation reaction, an oxidative decomposition layer having poor lithium-ion conductivity is formed between the positive electrode active material and the halide solid electrolyte, and the oxidative decomposition layer functions as a large interfacial resistance in an electrode reaction of the positive electrode. It is considered that chlorine, bromine, and iodine have a relatively large ionic radius and a small interaction force with a cationic component of the halide solid electrolyte, and accordingly are easily oxidized.

As a result of intensive studies to suppress an increase in internal resistance of a battery during charge, the present inventors elucidated as follows; in the case where a positive electrode material includes a positive electrode active material and a solid electrolyte material coating at least partially the positive electrode active material and the solid electrolyte material is a halide solid electrolyte containing fluorine, the positive electrode material exhibits excellent oxidation resistance to enable to suppress an increase in internal resistance of a battery including the positive electrode material during charge. Although the details of the mechanism are not elucidated, the present inventors inferred the reasons as follows; in the case where the halide solid electrolyte contains fluorine having high electronegativity as anions among halogen elements, fluorine is strongly bonded to cations, and accordingly an oxidation reaction of fluorine, that is, a side reaction in which electrons are extracted from fluorine, is less likely to proceed.

Moreover, the present inventors found that in the case where a fluorine-containing halide solid electrolyte contains lithium (i.e., Li), titanium (i.e., Ti), and M1, the fluorine-containing halide solid electrolyte has high lithium-ion conductivity and high oxidation resistance, where M1 is at least one element selected from the group consisting of calcium (i.e., Ca), magnesium (i.e., Mg), aluminum (i.e., Al), yttrium (i.e., Y), and zirconium (i.e., Zr).

The above findings are summed up as follows. In the case where a positive electrode material has a configuration below, the positive electrode material has high oxidation resistance and accordingly can suppress an increase in internal resistance of a battery during charge. In the configuration, the positive electrode material includes a positive electrode active material and a solid electrolyte material coating at least partially the surface of the positive electrode active material, and the solid electrolyte material contains Li, Ti, M1, and F where M1 is at least one element selected from the group consisting of Ca, Mg, Al, Y, and Zr. Furthermore, since the solid electrolyte material has high ionic conductivity, the interfacial resistance between the positive electrode active material and the solid electrolyte material can be reduced, thereby improving the output characteristics of the battery.

Outline of One Aspect According to the Present Disclosure

A positive electrode material according to a first aspect of the present disclosure includes:
- a positive electrode active material; and
- a first solid electrolyte material coating at least partially a surface of the positive electrode active material, wherein
- the first solid electrolyte material includes Li, Ti, M1, and F, and
- the M1 is at least one element selected from the group consisting of Ca, Mg, Al, Y, and Zr.

The positive electrode material according to the first aspect has high oxidation resistance. Therefore, the positive electrode material according to the first aspect can suppress an increase in internal resistance of a battery during charge. Also, the first solid electrolyte material has high ionic conductivity. Accordingly, in the positive electrode material, a low interfacial resistance between the first solid electrolyte material and the positive electrode active material can be achieved. Therefore, the positive electrode material according to the first aspect can improve the output characteristics of the battery.

In a second aspect of the present disclosure, for example, in the positive electrode material according to the first aspect, the M1 may include at least one element selected from the group consisting of Mg and Ca.

In the positive electrode material according to the second aspect, the first solid electrolyte material exhibits higher ionic conductivity. Accordingly, in the positive electrode material, a lower interfacial resistance between the first solid electrolyte material and the positive electrode active material can be achieved.

In a third aspect of the present disclosure, for example, in the positive electrode material according to the first or second aspect, the first solid electrolyte material may include a material represented by the following composition formula (1), $$Li_{6-(4-2x1)b1}(Ti_{1-x1}M1_{x1})_{b1}F_6 \qquad \text{Formula (1)}$$

where $0 < x1 \leq 1$ and $0 < b1 \leq 3$ are satisfied.

In the positive electrode material according to the third aspect, the first solid electrolyte material exhibits higher ionic conductivity. Accordingly, in the positive electrode material, a lower interfacial resistance between the first solid electrolyte material and the positive electrode active material can be achieved.

In a fourth aspect of the present disclosure, for example, in the positive electrode material according to the third aspect, the first solid electrolyte material may include $Li_3Ti_{0.5}Mg_{0.5}F_6$.

In the positive electrode material according to the fourth aspect, the first solid electrolyte material exhibits higher ionic conductivity. Accordingly, in the positive electrode material, a lower interfacial resistance between the first solid electrolyte material and the positive electrode active material can be achieved.

In a fifth aspect of the present disclosure, for example, in the positive electrode material according to the third aspect, the first solid electrolyte material may include $Li_3Ti_{0.5}Ca_{0.5}F_6$.

In the positive electrode material according to the fifth aspect, the first solid electrolyte material exhibits higher ionic conductivity. Accordingly, in the positive electrode material, a lower interfacial resistance between the first solid electrolyte material and the positive electrode active material can be achieved.

In a sixth aspect of the present disclosure, for example, in the positive electrode material according to the first aspect, the M1 may include at least one element selected from the group consisting of Al and Y.

In the positive electrode material according to the sixth aspect, the first solid electrolyte material exhibits higher ionic conductivity. Accordingly, in the positive electrode material, a lower interfacial resistance between the first solid electrolyte material and the positive electrode active material can be achieved.

In a seventh aspect of the present disclosure, for example, in the positive electrode material according to the first or sixth aspect, the first solid electrolyte material may include a material represented by the following composition formula (2), $$Li_{6-(4-x2)b2}(Ti_{1-x2}M1_{x2})_{b2}F_6 \qquad \text{Formula (2)}$$

where $0 < x2 < 1$ and $0 < b2 \leq 1.5$ are satisfied.

In the positive electrode material according to the seventh aspect, the first solid electrolyte material exhibits higher ionic conductivity. Accordingly, in the positive electrode material, a lower interfacial resistance between the first solid electrolyte material and the positive electrode active material can be achieved.

In an eighth aspect of the present disclosure, for example, in the positive electrode material according to the seventh aspect, the first solid electrolyte material may include $Li_{2.6}Ti_{0.4}Al_{0.6}F_6$.

In the positive electrode material according to the eighth aspect, the first solid electrolyte material exhibits higher ionic conductivity. Accordingly, in the positive electrode material, a lower interfacial resistance between the first solid electrolyte material and the positive electrode active material can be achieved.

In a ninth aspect of the present disclosure, for example, in the positive electrode material according to the first aspect, the M1 may include Zr.

In the positive electrode material according to the ninth aspect, the first solid electrolyte material exhibits higher ionic conductivity. Accordingly, in the positive electrode material, a lower interfacial resistance between the first solid electrolyte material and the positive electrode active material can be achieved.

In a tenth aspect of the present disclosure, for example, in the positive electrode material according to the ninth aspect, the first solid electrolyte material may include a material represented by the following composition formula (3), $$Li_{6-4b3}(Ti_{1-x3}Zr_{x3})_{b3}F_6 \quad \text{Formula (3)}$$

where $0<x3<1$ and $0<b3\leq1.5$ are satisfied.

In the positive electrode material according to the tenth aspect, the first solid electrolyte material exhibits higher ionic conductivity. Accordingly, in the positive electrode material, a lower interfacial resistance between the first solid electrolyte material and the positive electrode active material can be achieved.

In an eleventh aspect of the present disclosure, for example, in the positive electrode material according to the tenth aspect, the first solid electrolyte material may include $Li_3Ti_{0.5}Zr_{0.5}F_7$.

In the positive electrode material according to the eleventh aspect, the first solid electrolyte material exhibits higher ionic conductivity. Accordingly, in the positive electrode material, a lower interfacial resistance between the first solid electrolyte material and the positive electrode active material can be achieved.

In a twelfth aspect of the present disclosure, for example, in the positive electrode material according to the first aspect, the M1 may include Al and at least one element selected from the group consisting of Mg and Zr.

In the positive electrode material according to the twelfth aspect, the first solid electrolyte material exhibits higher ionic conductivity. Accordingly, in the positive electrode material, a lower interfacial resistance between the first solid electrolyte material and the positive electrode active material can be achieved.

In a thirteenth aspect of the present disclosure, for example, the positive electrode material according to any one of the first to twelfth aspects may further include a second electrolyte material that is a material different from the first solid electrolyte material.

In the positive electrode material according to the thirteenth aspect, resistance derived from migration of Li ions in the positive electrode material can be reduced, thereby more effectively suppressing an increase in internal resistance of the battery during charge.

In a fourteenth aspect of the present disclosure, for example, in the positive electrode material according to the thirteenth aspect, the second electrolyte material may be represented by the following composition formula (5), $$Li_\alpha M2_\beta X_\gamma \quad \text{Formula (5)}$$

where α, β, and γ each may be a value greater than 0,
the M2 may include at least one of a metalloid element and a metal element other than Li, and
X may be at least one element selected from the group consisting of F, Cl, Br, and I.

In the positive electrode material according to the fourteenth aspect, the ionic conductivity of the second electrolyte material can be further increased. Accordingly, resistance derived from migration of Li ions in the positive electrode material can be further reduced, thereby more effectively suppressing an increase in internal resistance of the battery during charge.

In a fifteenth aspect of the present disclosure, for example, in the positive electrode material according to the fourteenth aspect, the M2 may include Y.

In the positive electrode material according to the fifteenth aspect, the ionic conductivity of the second electrolyte material can be further increased. Accordingly, resistance derived from migration of Li ions in the positive electrode material can be further reduced, thereby more effectively suppressing an increase in internal resistance of the battery during charge.

In a sixteenth aspect of the present disclosure, for example, in the positive electrode material according to the fourteenth or fifteenth aspect, the composition formula (5) may satisfy:

$$2.5\leq\alpha\leq3;$$

$$1\leq\beta\leq1.1; \text{ and}$$

$$\gamma=6.$$

In the positive electrode material according to the sixteenth aspect, the ionic conductivity of the second electrolyte material can be further increased. Accordingly, resistance derived from migration of Li ions in the positive electrode material can be further reduced, thereby more effectively suppressing an increase in internal resistance of the battery during charge.

In a seventeenth aspect of the present disclosure, for example, in the positive electrode material according to the thirteenth aspect, the second electrolyte material may include a sulfide solid electrolyte.

In the positive electrode material according to the seventeenth aspect, the ionic conductivity of the second electrolyte material can be further increased. Accordingly, resistance derived from migration of Li ions in the positive electrode material can be further reduced, thereby more effectively suppressing an increase in internal resistance of the battery during charge.

In an eighteenth aspect of the present disclosure, for example, in the positive electrode material according to the seventeenth aspect, the sulfide solid electrolyte may include lithium sulfide and phosphorus sulfide.

In the positive electrode material according to the eighteenth aspect, the ionic conductivity of the second electrolyte material can be further increased. Accordingly, resistance derived from migration of Li ions in the positive electrode material can be further reduced, thereby more effectively suppressing an increase in internal resistance of the battery during charge.

In a nineteenth aspect of the present disclosure, for example, in the positive electrode material according to the seventeenth or eighteenth aspect, the sulfide solid electrolyte may be $Li_2S—P_2S_5$.

In the positive electrode material according to the nineteenth aspect, the ionic conductivity of the second electrolyte material can be further increased. Accordingly, resistance derived from migration of Li ions in the positive electrode material can be further reduced, thereby more effectively suppressing an increase in internal resistance of the battery during charge.

In a twentieth aspect of the present disclosure, for example, in the positive electrode material according to the thirteenth aspect, the second electrolyte material may be an electrolyte solution including a lithium salt and a solvent.

The positive electrode material according to the twentieth aspect can suppress an increase in internal resistance of the battery during charge.

In a twenty-first aspect of the present disclosure, for example, in the positive electrode material according to any one of the first to twentieth aspects, the positive electrode active material may include lithium nickel cobalt manganese oxide.

The positive electrode material according to the twenty-first aspect can further improve the energy density and the charge and discharge efficiency of the battery.

In a twenty-second aspect of the present disclosure, for example, in the positive electrode material according to the thirteenth aspect, the first solid electrolyte material may be provided between the positive electrode active material and the second electrolyte material.

In the positive electrode material according to the twenty-second aspect, by interposing the first solid electrolyte material having high oxidation resistance between the positive electrode active material and the second electrolyte material, oxidative decomposition of the second electrolyte material can be suppressed, thereby suppressing an increase in internal resistance of the battery during charge.

A battery according to a twenty-third aspect of the present disclosure includes:
- a positive electrode including the positive electrode material according to any one of the first to twenty-second aspects;
- a negative electrode; and
- an electrolyte layer disposed between the positive electrode and the negative electrode.

In the battery according to the twenty-third aspect, an increase in internal resistance of the battery during charge can be suppressed.

In a twenty-fourth aspect of the present disclosure, for example, in the battery according to the twenty-third aspect, the positive electrode material may further include a second electrolyte material that is a material different from the first solid electrolyte material, and the electrolyte layer may include a material that is the same as the first solid electrolyte material or the same as the second electrolyte material.

The battery according to the twenty-fourth aspect has further improved output density and charge and discharge characteristics.

In a twenty-fifth aspect of the present disclosure, for example, in the battery according to the twenty-fourth aspect, the electrolyte layer may include the material that is the same as the first solid electrolyte material.

In the battery according to the twenty-fifth aspect, an increase in internal resistance of the battery during charge caused by oxidation of the electrolyte layer is suppressed, thereby further improving the output density and the charge and discharge characteristics.

In a twenty-sixth aspect of the present disclosure, for example, in the battery according to the twenty-third or twenty-fourth aspect, the electrolyte layer may include a first electrolyte layer and a second electrolyte layer, and the first electrolyte layer may be in contact with the positive electrode, and the second electrolyte layer may be in contact with the negative electrode.

In the battery according to the twenty-sixth aspect, an increase in internal resistance of the battery during charge can be suppressed.

In a twenty-seventh aspect of the present disclosure, for example, in the battery according to the twenty-sixth aspect, the first electrolyte layer may include a material that is the same as the first solid electrolyte material.

In the battery according to the twenty-seventh aspect, by including the first solid electrolyte material having excellent oxidation resistance in the first electrolyte layer, it is possible to suppress oxidative decomposition of the first electrolyte layer. Therefore, it is possible to suppress an increase in internal resistance of the battery during charge.

In a twenty-eighth aspect of the present disclosure, for example, in the battery according to the twenty-sixth or twenty-seventh aspect, the second electrolyte layer may include a material that is different from the first solid electrolyte material.

The battery according to the twenty-eighth aspect has further improved charge and discharge characteristics.

Embodiments of the present disclosure will be described below with reference to the drawings.

Embodiment 1

Figure 1:
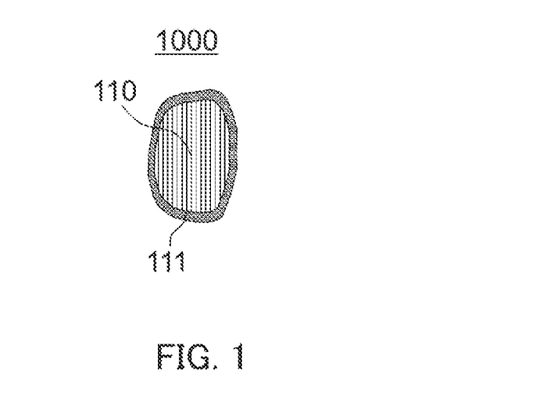
FIG. 1 is a cross-sectional view schematically showing the configuration of a positive electrode material 1000 of Embodiment 1.

FIG. 1 is a cross-sectional view schematically showing the configuration of a positive electrode material 1000 of Embodiment 1. As shown in FIG. 1, the positive electrode material 1000 of Embodiment 1 includes a positive electrode active material 110 and a first solid electrolyte material 111 coating at least partially the surface of the positive electrode active material 110. Here, the first solid electrolyte material 111 includes Li, Ti, M1, and F, and M1 is at least one element selected from the group consisting of Ca, Mg, Al, Y, and Zr.

With the above configuration, the positive electrode material 1000 has high oxidation resistance. Therefore, the positive electrode material 1000 can suppress an increase in internal resistance of a battery during charge. Also, the first solid electrolyte material 111 has high ionic conductivity. Accordingly, in the positive electrode material 1000, a low interfacial resistance between the first solid electrolyte material 111 and the positive electrode active material 110 can be achieved.

M1 may be at least one element selected from the group consisting of Ca and Mg.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

In the case where M1 is at least one element selected from the group consisting of Ca and Mg, the ratio of the amount of substance of Li to the total of the amounts of substance of Ca, Mg, and Ti may be 0.5 or more and 4.5 or less.

In the case where M1 is at least one element selected from the group consisting of Ca and Mg, the first solid electrolyte material 111 may include a material represented by the following composition formula (1). The material represented by the following composition formula (1) may have a crystalline phase.

$$Li_{6-(4-2x1)b1}(Ti_{1-x1}M1_{x1})_{b1}F_6 \qquad \text{Formula (1)},$$

where $0<x1\leq 1$ and $0<b1\leq 3$ are satisfied.

In the composition formula (1), $0.05\leq x1\leq 0.9$ may be satisfied.

In the composition formula (1), M1 may be Mg and $0.05\leq x1\leq 0.6$ may be satisfied.

In the composition formula (1), M1 may be Ca and $x1=0.5$ may be satisfied.

In the composition formula (1), $0.80\leq b1\leq 1.71$ may be satisfied.

With the above configuration, the first solid electrolyte material 111 exhibits higher ionic conductivity.

The first solid electrolyte material 111 may include $Li_3Ti_{0.5}Mg_{0.5}F_6$.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

The first solid electrolyte material 111 may include $Li_3Ti_{0.5}Ca_{0.5}F_6$.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

M1 may contain at least one element selected from the group consisting of Al and Y.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

In the case where M1 is at least one element selected from the group consisting of Al and Y, the ratio of the amount of substance of Li to the total of the amounts of substance of Al, Y, and Ti may be 1.7 or more and 4.2 or less.

In the case where M1 is at least one element selected from the group consisting of Al and Y, the first solid electrolyte material 111 may include a material represented by the following composition formula (2). The material represented by the composition formula (2) may have a crystalline phase.

$$Li_{6-(4-x2)b2}(Ti_{1-x2}M1_{x2})_{b2}F_6 \qquad \text{Formula (2)},$$

where $0<x2<1$ and $0<b2\leq1.5$ are satisfied.

In the composition formula (2), M1 may be Al.

In the composition formula (2), $0.1\leq x2\leq 0.9$ may be satisfied.

In the composition formula (2), M1 may be Y and $0.3\leq x2\leq 0.7$ may be satisfied.

In the composition formula (2), $0.8\leq b2\leq 1.2$ may be satisfied.

With the above configuration, the first solid electrolyte material 111 exhibits higher ionic conductivity.

The first solid electrolyte material 111 may include $Li_{2.6}Ti_{0.4}Al_{0.6}F_6$.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

M1 may include Zr.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

In the case where M1 is Zr, the ratio of the amount of substance of Li to the total of the amounts of substance of Ti and Zr may be 2.0 or more and 6.0 or less.

In the case where M1 is Zr, the first solid electrolyte material 111 may include a material represented by the following composition formula (3). The material represented by the composition formula (3) may have a crystalline phase.

$$Li_{6-4b3}(Ti_{1-x3}Zr_{x3})_{b3}F_6 \qquad \text{Formula (3)},$$

where $0<x3<1$ and $0<b3\leq1.5$ are satisfied.

In the composition formula (3), $0.1\leq x3\leq 0.8$ may be satisfied.

In the composition formula (3), $0.6\leq b3\leq 1.0$ may be satisfied.

With the above configuration, the first solid electrolyte material 111 exhibits higher ionic conductivity.

The first solid electrolyte material 111 may include $Li_3Ti_{0.5}Zr_{0.5}F_7$.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

M1 may include Al and at least one element selected from the group consisting of Mg and Zr.

With the above configuration, the first solid electrolyte material 111 exhibits higher ionic conductivity. Accordingly, in the positive electrode material 1000, a low interfacial resistance between the first solid electrolyte material 111 and the positive electrode active material 110 can be achieved.

In the case where M1 includes Al and at least one element selected from the group consisting of Mg and Zr, the ratio of the amount of substance of Li to the total of the amounts of substance of Zr, Mg, Ti, and Al may be 1.33 or more and 3.79 or less.

In the case where M1 includes Al and at least one element selected from the group consisting of Mg and Zr, the first solid electrolyte material 111 may include a material represented by the following composition formula (4). The material represented by the composition formula (4) may have a crystalline phase.

$$Li_{6-(4-x4-(4-m)y)b4}(Ti_{1-x4-y}Al_{x4}M1_y)_{b4}F_6 \qquad \text{Formula (4)},$$

where m represents the valence of M1, and $0<x4<1$, $0<y<1$, $0<(x4+y)<1$, and $0<b4\leq1.5$ are satisfied.

In the composition formula (4), $0.05\leq x4\leq 0.9$ may be satisfied.

In the composition formula (4), $0.05\leq y\leq 0.9$ may be satisfied.

In the composition formula (4), M1 may be Mg and $0.33\leq x4\leq 0.7$ may be satisfied.

In the composition formula (4), M1 may be Mg and $0.1\leq y\leq 0.33$ may be satisfied.

In the composition formula (4), $0.8\leq b4\leq 1.2$ may be satisfied.

With the above configuration, the first solid electrolyte material 111 exhibits higher ionic conductivity.

To further increase the ionic conductivity of the first solid electrolyte material 111, the first solid electrolyte material 111 may contain an element other than F as anions. Examples of the element contained as the anions include Cl, Br, I, O, S, and Se.

Figure 2:
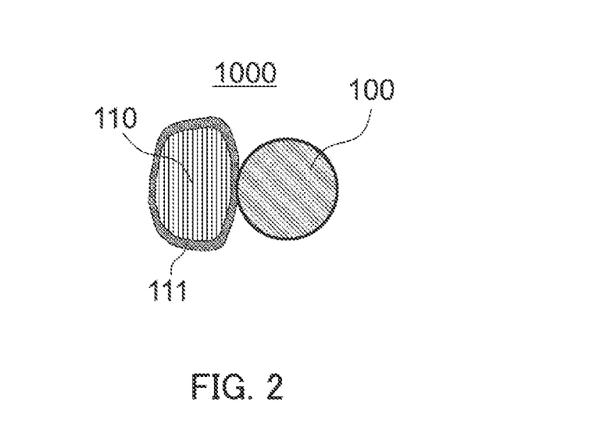
FIG. 2 is a cross-sectional view schematically showing the configuration of the positive electrode material 1000 of Embodiment 1 including a second electrolyte material 100.

As shown in FIG. 2, the positive electrode material 1000 of Embodiment 1 may further include a second electrolyte material 100 that is a material different from the first solid electrolyte material 111. Here, the phrase "the second electrolyte material 100 is different from the first solid electrolyte material 111" means, for example, that the second electrolyte material 100 has a composition different from that of the first solid electrolyte material 111, or that the second electrolyte material 100 is in a state different from that of the first solid electrolyte material 111, for example, is an electrolyte solution.

By including the second electrolyte material 100, resistance derived from migration of Li ions in the positive electrode material 1000 can be reduced.

The second electrolyte material 100 may be a material represented by the following composition formula (5).

$$Li_\alpha M2_\beta X_\gamma \qquad \text{Formula (5)},$$

where α, β, and γ are each a value greater than 0, M2 includes at least one of a metalloid element and a metal element other than Li, and X is at least one element selected from the group consisting of F, Cl, Br, and I.

With the above configuration, the ionic conductivity of the second electrolyte material 100 can be further increased. Accordingly, resistance derived from migration of Li ions in the positive electrode material 1000 can be further reduced.

The term "metalloid elements" are B, Si, Ge, As, Sb, and Te.

The term "metal elements" are all the elements included in Groups 1 to 12 of the periodic table except for hydrogen and all the elements included in Groups 13 to 16 of the periodic table except for B, Si, Ge, As, Sb, Te, C, N, P, O, S, and Se. In other words, "metalloid elements" and "metal elements" are each a group of elements that can become cations when forming an inorganic compound with a halogen compound.

M2 in the second electrolyte material 100 may include Y. In other words, the second electrolyte material 100 may include Y as a metal element.

With the above configuration, the ionic conductivity of the second electrolyte material 100 can be further increased. Accordingly, resistance derived from migration of Li ions in the positive electrode material 1000 can be further reduced.

In the composition formula (5), $0<\alpha<6$, $0<\beta<3$, and $\gamma=6$ may be satisfied.

In the composition formula (5), $2.5\leq\alpha\leq3$, $1\leq\beta\leq1.1$, and $\gamma=6$ may be satisfied.

With the above configuration, the ionic conductivity of the second electrolyte material 100 can be further increased. Accordingly, resistance derived from migration of Li ions in the positive electrode material 1000 can be further reduced.

The second electrolyte material 100 including Y may be, for example, a compound represented by a composition formula $Li_{a1}Me_{b5}Y_cX_6$. Here, a1+m'b5+3c=6 and c>0 are satisfied. Me is at least one element selected from the group consisting of a metalloid element and a metal element other than Li and Y. Furthermore, m' represents the valence of Me.

As Me, at least one element selected from the group consisting of Mg, Ca, Sr, Ba, Zn, Sc, Al, Ga, Bi, Zr, Hf, Ti, Sn, Ta, and Nb may be used.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A1).

$$Li_{6-3d}Y_dX_6 \quad \text{Formula (A1)},$$

where, in the composition formula (A1), X is a halogen element and includes Cl.

Furthermore, 0<d<2 is satisfied.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A2).

$$Li_3YX_6 \quad \text{Formula (A2)},$$

where, in the composition formula (A2), X is a halogen element and includes Cl.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A3).

$$Li_{3-3\delta 1}Y_{1+\delta 1}Cl_6 \quad \text{Formula (A3)},$$

where, in the composition formula (A3), $0<\delta 1\leq0.15$ is satisfied.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A4).

$$Li_{3-3\delta 2+a2}Y_{1+\delta 2-a2}Me_{a2}Cl_{6-x5}Br_{x5} \quad \text{Formula (A4)},$$

where, in the composition formula (A4), Me is at least one element selected from the group consisting of Mg, Ca, Sr, Ba, and Zn. Furthermore, $-1\leq\delta 2<2$, $0<a2<3$, $0<(3-3\delta 2+a2)$, $0<(1+\delta 2-a2)$, and $0\leq x5\leq6$ are satisfied.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A5).

$$Li_{3-3\delta 3}Y_{1+\delta 3-a3}Me_{a3}Cl_{6-x6}Br_{x6} \quad \text{Formula (A5)},$$

where, in the composition formula (A5), Me is at least one element selected from the group consisting of Al, Sc, Ga, and Bi. Furthermore, $-1\leq\delta 3<1$, $0<a3<2$, $0<(1+\delta 3-a3)$, and $0\leq x6<6$ are satisfied.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A6).

$$Li_{3-3\delta 4-a4}Y_{1+\delta 4-a4}Me_{a4}Cl_{6-x7}Br_{x7} \quad \text{Formula (A6)},$$

where, in the composition formula (A6), Me is at least one element selected from the group consisting of Zr, Hf, and Ti. Furthermore, $-1\leq\delta 4<1$, $0<a4<1.5$, $0<(3-3\delta 4-a4)$, $0<(1+\delta 4-a4)$, and $0\leq x7<6$ are satisfied.

With the above configuration, the ionic conductivity of the second electrolyte material 100 can be further increased. Accordingly, resistance derived from migration of Li ions in the positive electrode material 1000 can be further reduced.

The second electrolyte material 100 may be a material represented by the following composition formula (A7).

$$Li_{3-3\delta 5-2a5}Y_{1+\delta 5-a5}Me_{a5}Cl_{6-x8}Br_{x8} \quad \text{Formula}(A7),$$

where, in the composition formula (A7), Me is at least one element selected from the group consisting of Ta and Nb. Furthermore, $-1\leq\delta 5<1$, $0<a5<1.2$, $0<(3-3\delta 5-2a5)$, $0<(1+\delta 5-a5)$, and $0\leq x8<6$ are satisfied.

With the above configuration, the ionic conductivity of the second electrolyte material 100 can be further increased. Accordingly, resistance derived from migration of Li ions in the positive electrode material 1000 can be further reduced.

As the second electrolyte material 100, $Li_3YX_6$, $Li_2MgX_4$, $Li_2FeX_4$, $Li(Al, Ga, In)X_4$, or $Li_3(Al, Ga, In)X_6$ can be used, for example. Here, X includes Cl. Note that, in the present disclosure, when an element in a formula is expressed such as "(Al, Ga, In)", this expression indicates at least one element selected from the group of elements in parentheses. In other words, the expression "(Al, Ga, In)" is synonymous with the expression "at least one selected from the group consisting of Al, Ga, and In". The same applies to other elements. In addition, the second electrolyte material 100 may be free of sulfur.

As the second electrolyte material 100, a sulfide solid electrolyte may be included. Examples of the sulfide solid electrolyte which can be used include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Also, LiX, $Li_2O$, $MO_q$, $Li_pMO_q$, or the like may be added these. Here, X is at least one element selected from the group consisting of F, Cl, Br, and I. Furthermore, M is at least one element selected from the group consisting of P, Si, Ge, B, Al, Ga, In, Fe, and Zn. Moreover, p and q are each independently a natural number.

With the above configuration, the ionic conductivity of the second electrolyte material 100 can be further increased. Accordingly, resistance derived from migration of Li ions in the positive electrode material 1000 can be further reduced.

The second electrolyte material 100 may include lithium sulfide and phosphorus sulfide. The sulfide solid electrolyte may be, for example, $Li_2S$—$P_2S_5$.

With the above configuration, the ionic conductivity of the second electrolyte material 100 can be further increased. Accordingly, resistance derived from migration of Li ions in the positive electrode material 1000 can be further reduced.

The second electrolyte material 100 may include an electrolyte solution.

The electrolyte solution contains, as a solvent, water or a nonaqueous solvent, and contains a lithium salt dissolved in the solvent.

Examples of the solvent include water, a cyclic carbonate solvent, a linear carbonate solvent, a cyclic ether solvent, a linear ether solvent, a cyclic ester solvent, a linear ester solvent, and a fluorinated solvent.

Examples of the cyclic carbonate solvent include ethylene carbonate, propylene carbonate, and butylene carbonate.

Examples of the linear carbonate solvent include dimethyl carbonate, ethyl methyl carbonate, and diethyl carbonate.

Examples of the cyclic ether solvent include tetrahydrofuran, 1,4-dioxane, and 1,3-dioxolane.

Examples of the linear ether solvent include 1,2-dimethoxyethane and 1,2-diethoxyethane.

Examples of the cyclic ester solvent include γ-butyrolactone.

Examples of the linear ester solvent include methyl acetate.

Examples of the fluorinated solvent include fluoroethylene carbonate, methyl fluoropropionate, fluorobenzene, fluoroethyl methyl carbonate, and fluorodimethylene carbonate.

As the solvent, one solvent selected from these can be used alone. Alternatively, as the solvent, a combination of two or more solvents selected from these can be used.

The electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4Fq)$, $LiC(SO_2CF_3)_3$, or the like can be used. As the lithium salt, one lithium salt selected from these can be used alone. Alternatively, a mixture of two or more lithium salts selected from these can be used. The concentration of the lithium salt falls within a range of, for example, 0.1 to 15 mol/L.

The positive electrode active material 110 includes a material having properties of occluding and releasing metal ions (e.g., lithium ions). Examples which can be used as the positive electrode active material 110 include a lithium-containing transition metal oxide, a transition metal fluoride, a polyanion material, a fluorinated polyanion material, a transition metal sulfide, a transition metal oxysulfide, and a transition metal oxynitride. Examples of the lithium-containing transition metal oxide include $Li(Ni, Co, Al)O_2$, $Li(Ni, Co, Mn)O_2$, and $LiCoO_2$. In particular, in the case where the lithium-containing transition metal oxide is used as the positive electrode active material 110, it is possible to reduce the manufacturing costs of the positive electrode material 1000, and to increase the average discharge voltage.

In Embodiment 1, the positive electrode active material 110 may include lithium nickel cobalt manganese oxide. For example, the positive electrode active material 110 may include $Li(Ni, Co, Mn)O_2$.

With the above configuration, it is possible to further increase the energy density and the charge and discharge efficiency of a battery including the positive electrode material 1000.

The first solid electrolyte material 111 may be provided between the positive electrode active material 110 and the second electrolyte material 100.

With the above configuration, by interposing the first solid electrolyte material 111 having high oxidation resistance between the positive electrode active material 110 and the second electrolyte material 100, oxidative decomposition of the second electrolyte material 100 can be suppressed. Therefore, it is possible to suppress an increase in internal resistance of the battery including the positive electrode material 1000 during charge.

The thickness of the first solid electrolyte material 111 coating at least partially the surface of the positive electrode active material 110 may be 1 nm or more and 500 nm or less.

In the case where the thickness of the first solid electrolyte material 111 is 1 nm or more, a direct contact between the positive electrode active material 110 and the second electrolyte material 100 can be suppressed, thereby suppressing oxidative decomposition of the second electrolyte material 100. Accordingly, it is possible to improve the charge and discharge efficiency of the battery including the positive electrode material 1000. In the case where the thickness of the first solid electrolyte material 111 is 500 nm or less, the thickness of the first solid electrolyte material 111 is not excessively large. Accordingly, it is possible to sufficiently reduce the internal resistance of the battery including the positive electrode material 1000, thereby increasing the energy density of the battery.

In addition, the method of measuring the thickness of the first solid electrolyte material 111 is not particularly limited. For example, the thickness can be obtained by directly observing the thickness of the first solid electrolyte material 111 with a transmission electron microscope or the like.

The mass proportion of the first solid electrolyte material 111 to the positive electrode active material 110 may be 0.01% or more and 30% or less.

In the case where the mass proportion of the first solid electrolyte material 111 to the positive electrode active material 110 is 0.01% or more, a direct contact between the positive electrode active material 110 and the second electrolyte material 100 can be suppressed, thereby suppressing oxidative decomposition of the second electrolyte material 100. Accordingly, it is possible to improve the charge and discharge efficiency of the battery including the positive electrode material 1000. In the case where the mass proportion of the first solid electrolyte material 111 to the positive electrode active material 110 is 30% or less, the thickness of the first solid electrolyte material 111 is not excessively large. Accordingly, it is possible to sufficiently reduce the internal resistance of the battery including the positive electrode material 1000, thereby increasing the energy density of the battery.

The first solid electrolyte material 111 may coat uniformly the surface of the positive electrode active material 110. Accordingly, a direct contact between the positive electrode active material 110 and the second electrolyte material 100 can be suppressed, thereby suppressing a side reaction of the second electrolyte material 100. Therefore, it is possible to further improve the charge and discharge characteristics of the battery including the positive electrode material 1000 and to suppress an increase in internal resistance of the battery during charge.

The first solid electrolyte material 111 may coat partially the surface of the positive electrode active material 110. A plurality of positive electrode active materials 110 are in direct contact with each other via their portions which are not covered with the first solid electrolyte material 111. Accordingly, the electron conductivity between the plurality of positive electrode active materials 110 improves. This enables the battery including the positive electrode material 1000 to operate at a high power.

The first solid electrolyte material 111 may coat 30% or more, 60% or more, or 90% or more of the surface of the positive electrode active material 110. The first solid electrolyte material 111 may coat substantially the entire surface of the positive electrode active material 110.

The surface of the positive electrode active material 110 may be at least partially coated with a coating material that is different from the first solid electrolyte material 111.

Examples of the coating material include a sulfide solid electrolyte, an oxide solid electrolyte, and a halide solid electrolyte. As the sulfide solid electrolyte and the halide solid electrolyte used as the coating material, the same materials as those exemplified for the second electrolyte material 100 may be used. Examples of the oxide solid electrolyte used as the coating material include a Li—Nb—O compound such as $LiNbO_3$, a Li—B—O compound such as $LiBC_2$ and $Li_3BO_3$, a Li—Al—O compound such as $LiAIC_2$, a Li—Si—O compound such as $Li_4SiO_4$, a Li—Ti—O compound such as $Li_2SO_4$ and $Li_4Ti_5O_{12}$, a Li—Zr—O compound such as $Li_2ZrO_3$, a Li—Mo—O compound such as $Li_2MoO_3$, a Li—V—C compound such as $LiV_2O_5$, a Li—W—O compound such as $Li_2WO_4$, and a Li—P—O compound such as $Li_3PO_4$.

With the above configuration, the oxidation resistance of the positive electrode material 1000 can be further improved. Accordingly, an increase in internal resistance of the battery during charge can be suppressed.

The positive electrode active material 110 and the first solid electrolyte material 111 may be separated from each other by the coating material so as not to be in direct contact with each other.

With the above configuration, the oxidation resistance of the positive electrode material 1000 can be further improved. Accordingly, an increase in internal resistance of the battery during charge can be suppressed.

The shape of the second electrolyte material 100 of Embodiment 1 is not particularly limited. In the case where the second electrolyte material 100 of Embodiment 1 is a powdery material, its shape may be, for example, acicular, spherical, or ellipsoidal. The shape of the second electrolyte material 100 may be, for example, particulate.

For example, in the case where the shape of the second electrolyte material 100 of Embodiment 1 is particulate (e.g., spherical), the median diameter of the second electrolyte material 100 may be 100 μm or less. In the case where the median diameter of the second electrolyte material 100 is 100 μm or less, the positive electrode active material 110 and the second electrolyte material 100 can form a favorable dispersion state in the positive electrode material 1000. This improves the charge and discharge characteristics of the battery including the positive electrode material 1000.

In Embodiment 1, the median diameter of the second electrolyte material 100 may be 10 μm or less. With the above configuration, the positive electrode active material 110 and the second electrolyte material 100 can form a favorable dispersion state in the positive electrode material 1000.

In Embodiment 1, the median diameter of the second electrolyte material 100 may be smaller than the median diameter of the positive electrode active material 110. With the above configuration, the second electrolyte material 100 and the positive electrode active material 110 can form a more favorable dispersion state in the positive electrode.

The median diameter of the positive electrode active material 110 may be 0.1 μm or more and 100 μm or less.

In the case where the median diameter of the positive electrode active material 110 is 0.1 μm or more, the positive electrode active material 110 and the second electrolyte material 100 can form a favorable dispersion state in the positive electrode material 1000. This improves the charge and discharge characteristics of the battery including the positive electrode material 1000. In the case where the median diameter of the positive electrode active material 110 is 100 μm or less, the diffusion rate of lithium in the positive electrode active material 110 increases. This enables the battery including the positive electrode material 1000 to operate at a high power.

The median diameter of the positive electrode active material 110 may be larger than the median diameter of the second electrolyte material 100. Accordingly, the positive electrode active material 110 and the second electrolyte material 100 can form a favorable dispersion state.

In the positive electrode material 1000 of Embodiment 1, the second electrolyte material 100 and the first solid electrolyte material 111 may be in contact with each other as shown in FIG. 2. At this time, the first solid electrolyte material 111 and the positive electrode active material 110 are in contact with each other.

The positive electrode material 1000 of Embodiment 1 may include a plurality of second electrolyte materials 100 and a plurality of positive electrode active materials 110.

In the positive electrode material 1000 of Embodiment 1, the content of the second electrolyte material 100 and the content of the positive electrode active material 110 may be the same, or may be different from each other.

<Method of Manufacturing First Solid Electrolyte Material 111>

The first solid electrolyte material 111 of Embodiment 1 can be manufactured, for example, by the following method.

Raw material powders of a binary halide at a blending ratio to obtain a desired composition are prepared. For example, to produce $Li_{2.7}Ti_{0.3}Al_{0.7}F_6$, LiF, $TiF_4$, and $AlF_3$ are prepared at a molar ratio of approximately 2.7:0.3:0.7. Taking into account a variation in composition during the synthesis process, the blending ratio may be adjusted in advance so as to offset the variation.

The raw material powders are well mixed, and then mixed, pulverized, and reacted together by a mechanochemical milling method. Subsequently, the raw material powders may be fired in a vacuum or in an inert atmosphere.

Alternatively, the raw material powders may be well mixed, and then fired in a vacuum or in an inert atmosphere. The firing conditions is preferably, for example, firing within a range of 100° C. to 300° C. for 1 hour or more. Furthermore, to suppress a variation in composition during the firing process, the firing is performed preferably by sealing the raw material powders in a closed vessel such as a quartz tube.

Thus, the first solid electrolyte material 111 including a composition such as described above is obtained.

<Method of Manufacturing Positive Electrode Material 1000>

The positive electrode material 1000 of Embodiment 1 can be manufactured, for example, by the following method.

The positive electrode active material 110 and the first solid electrolyte material 111 are prepared at a predetermined mass ratio. For example, Li(Ni, Co, Mn)O$_2$ as the positive electrode active material 110 and Li$_{2.7}$Ti$_{0.3}$Al$_{0.7}$F$_6$ as the first solid electrolyte material 111 are prepared. These two materials are put into the same reaction vessel. A shear force is imparted to the two materials with rotating blades, or a jet stream is used to collide the two materials with each other, for example. By such a method, the surface of the positive electrode active material Li(Ni, Co, Mn)O$_2$ can be at least partially coated with Li$_{2.7}$Ti$_{0.3}$Al$_{0.7}$F$_6$ which is the first solid electrolyte material 111. For example, a device can be used, such as a dry particle composing machine NOBILTA (manufactured by Hosokawa Micron Corporation), a high-speed flow impact machine (manufactured by Nara Machinery Co., Ltd.), or a jet mill.

By the above method, it is possible to manufacture the positive electrode material 1000 including the positive electrode active material Li(Ni, Co, Mn)O$_2$ whose surface is at least partially coated with Li$_{2.7}$Ti$_{0.3}$Al$_{0.7}$F$_6$ which is the first solid electrolyte material 111.

Embodiment 2

Embodiment 2 will be described below. The description overlapping with that of Embodiment 1 will be omitted as appropriate.

Figure 3:
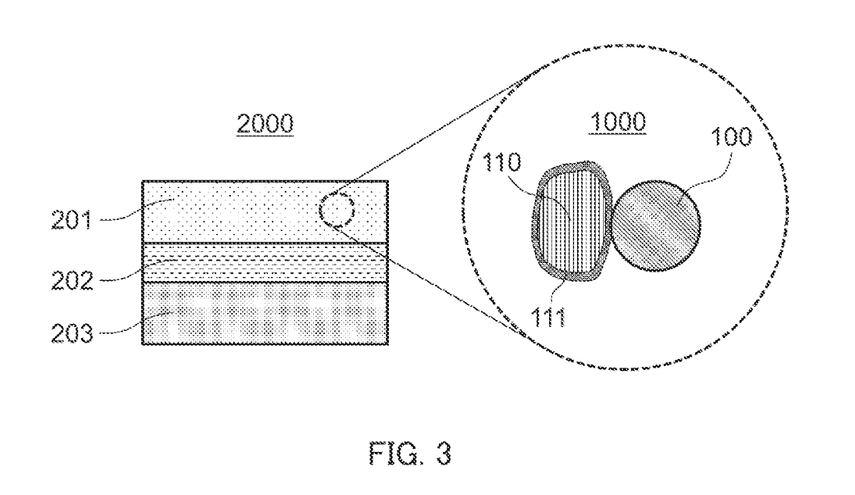
FIG. 3 is a cross-sectional view schematically showing the configuration of a battery 2000 of Embodiment 2.

FIG. 3 is a cross-sectional view schematically showing the configuration of a battery 2000 of Embodiment 2. The battery 2000 of Embodiment 2 includes a positive electrode 201, an electrolyte layer 202, and a negative electrode 203.

The positive electrode 201 includes the positive electrode material 1000 of Embodiment 1.

The electrolyte layer 202 is disposed between the positive electrode 201 and the negative electrode 203.

With the above configuration, an increase in internal resistance of the battery 2000 during charge can be suppressed.

In the volume ratio "v1:100−v1" of the positive electrode material 1000 to the second electrolyte material 100 included in the positive electrode 201, 30≤v1≤98 may be satisfied. Here, v1 represents, when the total volume of the positive electrode material 1000 and the second electrolyte material 100 included in the positive electrode 201 is defined as 100, the volume ratio of the positive electrode material 1000. In the case where 30≤v1 is satisfied, a sufficient energy density of the battery can be achieved. In the case where v1≤98 is satisfied, the battery 2000 can operate at a high power.

The thickness of the positive electrode 201 may be 10 μm or more and 500 μm or less. In the case where the thickness of the positive electrode 201 is 10 μm or more, a sufficient energy density of the battery can be achieved. In the case where the thickness of the positive electrode 201 is 500 μm or less, the battery 2000 can operate at a high power.

The electrolyte layer 202 includes an electrolyte material. The electrolyte material may be, for example, a third solid electrolyte material. In other words, the electrolyte layer 202 may be a solid electrolyte layer.

As the third solid electrolyte material, a material that is the same as the first solid electrolyte material 111 of Embodiment 1 or the same as the second electrolyte material 100 of Embodiment 1 may be used. In other words, the electrolyte layer 202 may include a material that is the same as the first solid electrolyte material 111 of Embodiment 1 or the same as the second electrolyte material 100 of Embodiment 1.

With the above configuration, the output density and the charge and discharge characteristics of the battery 2000 can be further improved.

As the third solid electrolyte material, the same material as the first solid electrolyte material 111 of Embodiment 1 may be used. In other words, the electrolyte layer 202 may include the same material as the first solid electrolyte material 111 of Embodiment 1.

With the above configuration, an increase in internal resistance of the battery 2000 during charge caused by oxidation of the electrolyte layer 202 can be suppressed, thereby further improving the output density and the charge and discharge characteristics of the battery 2000.

As the third solid electrolyte material included in the electrolyte layer 202, a halide solid electrolyte, a sulfide solid electrolyte, an oxide solid electrolyte, a polymer solid electrolyte, or a complex hydride solid electrolyte may be used.

Examples which can be used as the oxide solid electrolyte of the third solid electrolyte material include: a NASICON solid electrolyte typified by LiTi$_2$(PO$_4$)$_3$ and element-substituted substances thereof; a (LaLi)TiO$_3$-based perovskite solid electrolyte; a LISICON solid electrolyte typified by Li$_{14}$ZnGe$_4$O$_{16}$, Li$_4$SiO$_4$, and LiGeO$_4$ and element-substituted substances thereof; a garnet solid electrolyte typified by Li$_7$La$_3$Zr$_2$O$_{12}$ and element-substituted substances thereof; Li$_3$PO$_4$ and N-substituted substances thereof; and glass and glass ceramics that include a Li—B—O compound such as LiBO$_2$ or Li$_3$BO$_3$ as a base and to which Li$_2$SO$_4$, Li$_2$CO$_3$, or the like is added.

Examples which can be used as the polymer solid electrolyte of the third solid electrolyte material include a compound of a polymer compound and a lithium salt. The polymer compound may have an ethylene oxide structure. A polymer compound having an ethylene oxide structure can contain a large amount of a lithium salt. Accordingly, the ionic conductivity can be further increased. Examples which can be used as the lithium salt include LiPF$_6$, LiBF$_4$, LiSbF$_6$, LiAsF$_6$, LiSO$_3$CF$_3$, LiN(SO$_2$CF$_3$)$_2$, LiN(SO$_2$C$_2$F$_5$)$_2$, LiN(SO$_2$CF$_3$)(SO$_2$C$_4$Fq), and LiC(SO$_2$CF$_3$)$_3$. One lithium salt selected from the exemplified lithium salts can be used alone. Alternatively, a mixture of two or more lithium salts selected from the exemplified lithium salts can be used.

Examples which can be used as the complex hydride solid electrolyte of the third solid electrolyte material include LiBH$_4$—LiI and LiBH$_4$—P$_2$S$_5$.

The electrolyte layer 202 may include the third solid electrolyte material as its main component. In other words, the electrolyte layer 202 may include the third solid electrolyte material, for example, at a mass proportion of 50% or more (i.e., 50 mass % or more) with respect to the entire electrolyte layer 202.

With the above configuration, the charge and discharge characteristics of the battery can be further improved.

The electrolyte layer 202 may include the third solid electrolyte material, for example, at a mass proportion of 70% or more (i.e., 70 mass % or more) with respect to the entire electrolyte layer 202.

With the above configuration, the charge and discharge characteristics of the battery 2000 can be further improved.

The electrolyte layer 202 may include the third solid electrolyte material as its main component and further include inevitable impurities, a starting material used for synthesis of the third solid electrolyte material, a by-product, a decomposition product, etc.

The electrolyte layer 202 may include the third solid electrolyte material, for example, at a mass proportion of 100% (i.e., 100 mass %) with respect to the entire electrolyte layer 202, except for inevitably incorporated impurities.

With the above configuration, the charge and discharge characteristics of the battery 2000 can be further improved.

As described above, the electrolyte layer 202 may consist of the third solid electrolyte material.

The electrolyte layer 202 may include two or more of the materials listed as the third solid electrolyte material. For example, the electrolyte layer 202 may include a halide solid electrolyte and a sulfide solid electrolyte.

The thickness of the electrolyte layer 202 may be 1 μm or more and 300 μm or less. In the case where the thickness of the electrolyte layer 202 is 1 μm or more, a short circuit between the positive electrode 201 and the negative electrode 203 is less likely to occur. In the case where the thickness of the electrolyte layer 202 is 300 μm or less, the battery 2000 can operate at a high power.

The negative electrode 203 includes a material having properties of occluding and releasing metal ions (e.g., lithium ions). The negative electrode 203 includes, for example, a negative electrode active material.

Examples which can be used as the negative electrode active material include a metal material, a carbon material, an oxide, a nitride, a tin compound, and a silicon compound. The metal material may be an elemental metal. Alternatively, the metal material may be an alloy. Examples of the metal material include lithium metal and a lithium alloy. Examples of the carbon material include natural graphite, coke, semi-graphitized carbon, a carbon fiber, spherical carbon, artificial graphite, and amorphous carbon. From the viewpoint of capacity density, silicon, tin, a silicon compound, or a tin compound can be used.

The negative electrode 203 may include a solid electrolyte material. As the solid electrolyte material, the solid electrolyte materials exemplified as the materials of the electrolyte layer 202 may be used. With the above configuration, the lithium-ion conductivity inside the negative electrode 203 can be improved, and accordingly the battery 2000 can operate at a high power.

The median diameter of the negative electrode active material particles may be 0.1 μm or more and 100 μm or less. In the case where the median diameter of the negative electrode active material particles is 0.1 μm or more, the negative electrode active material particles and the solid electrolyte material can form a favorable dispersion state in the negative electrode. This improves the charge and discharge characteristics of the battery 2000. In the case where the median diameter of the negative electrode active material particles is 100 μm or less, diffusion of lithium in the negative electrode active material particles is fast. This enables the battery 2000 to operate at a high power.

The median diameter of the negative electrode active material particles may be larger than the median diameter of the solid electrolyte material included in the negative electrode 203. Thus, a favorable dispersion state of the negative electrode active material particles and the solid electrolyte material can be formed.

In the volume ratio "v2:100−v2" of the negative electrode active material particles to the solid electrolyte material included in the negative electrode 203, $30 \leq v2 \leq 95$ may be satisfied. Here, v2 represents, when the total volume of the negative electrode active material particles and the solid electrolyte material included in the negative electrode 203 is defined as 100, the volume ratio of the negative electrode active material particles. In the case where $30 \leq v2$ is satisfied, a sufficient energy density of the battery can be achieved. In the case where $v2 \leq 95$ is satisfied, the battery 2000 can operate at a high power.

The thickness of the negative electrode 203 may be 10 μm or more and 500 μm or less. In the case where the thickness of the negative electrode 203 is 10 μm or more, a sufficient energy density of the battery 2000 can be achieved. In the case where the thickness of the negative electrode 203 is 500 μm or less, the battery 2000 can operate at a high power.

At least one selected from the group consisting of the positive electrode 201, the electrolyte layer 202 and the negative electrode 203 may contain a binder for the purpose of improving the adhesion between particles. The binder is used to improve the binding properties of the materials of the electrodes. Examples of the binder include polyvinylidene fluoride, polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene-butadiene rubber, and carboxymethylcellulose. Furthermore, as the binder can also be used a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Moreover, a mixture of two or more selected from these may also be used.

At least one of the positive electrode 201 and the negative electrode 203 may contain a conductive additive for the purpose of improving the electronic conductivity. Examples of the conductive additive include: graphites such as natural graphite and artificial graphite; carbon blacks such as acetylene black and Ketjenblack; conductive fibers such as a carbon fiber and a metal fiber; metal powders such as a fluorinated carbon powder and an aluminum powder; conductive whiskers such as a zinc oxide whisker and a potassium titanate whisker; conductive metal oxides such as titanium oxide; and conductive polymer compounds such as polyaniline compound, polypyrrole compound, and polythiophene compound. Using a conductive carbon additive as the conductive additive can seek cost reduction.

The shape of the battery 2000 of Embodiment 2 is, for example, a coin type, a cylindrical type, a prismatic type, a sheet type, a button type, a flat type, or a stack type.

The battery 2000 of Embodiment 2 may be manufactured, for example, by preparing each of the positive electrode material 1000 of Embodiment 1, a material for forming an electrolyte layer, and a material for forming a negative electrode, and producing by a known method a stack in which a positive electrode, the electrolyte layer, and the negative electrode are disposed in this order.

Embodiment 3

Embodiment 3 will be described below. The description overlapping with that of Embodiment 2 will be omitted as appropriate.

Figure 4:
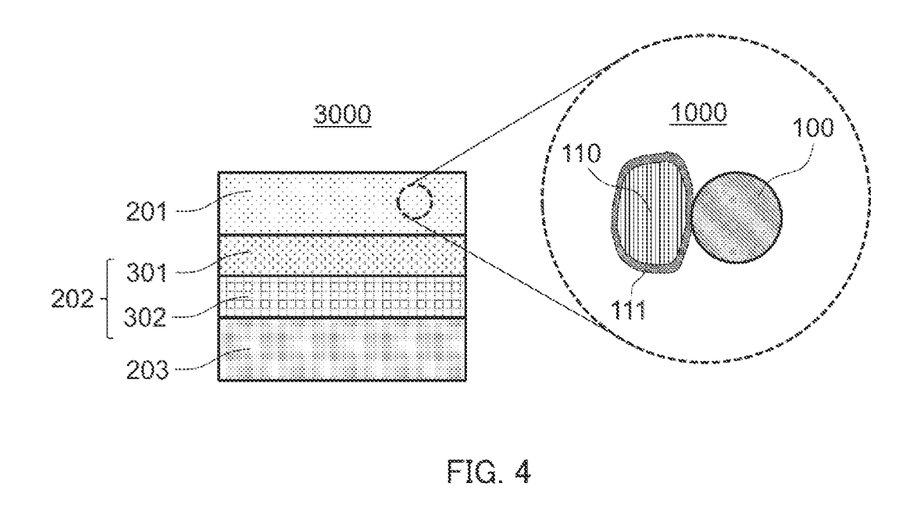
FIG. 4 is a cross-sectional view schematically showing the configuration of a battery 3000 of Embodiment 3.

FIG. 4 is a cross-sectional view schematically showing the configuration of a battery 3000 of Embodiment 3.

The battery 3000 of Embodiment 3 includes the positive electrode 201, the electrolyte layer 202, and the negative electrode 203.

The positive electrode 201 includes the positive electrode material 1000 of Embodiment 1.

The electrolyte layer 202 is disposed between the positive electrode 201 and the negative electrode 203.

The electrolyte layer 202 includes a first electrolyte layer 301 and a second electrolyte layer 302. The first electrolyte layer 301 is in contact with the positive electrode 201, and the second electrolyte layer 302 is in contact with the negative electrode 203.

With the above configuration, an increase in internal resistance of the battery 3000 during charge can be suppressed.

The first electrolyte layer 301 may include a material that is the same as the first solid electrolyte material 111.

By including the first solid electrolyte material 111 having excellent oxidation resistance in the first electrolyte layer 301 in contact with the positive electrode 201, oxidative decomposition of the first electrolyte layer 301 can be suppressed, thereby suppressing an increase in internal resistance of the battery 3000 during charge.

In addition, the second electrolyte layer 302 may include a material that is different from the first solid electrolyte material 111.

From the viewpoint of reduction resistance of the solid electrolyte material, the reduction potential of the solid electrolyte material included in the first electrolyte layer 301 may be lower than the reduction potential of the solid electrolyte material included in the second electrolyte layer 302. With the above configuration, the solid electrolyte material included in the first electrolyte layer 301 can be used without being reduced. As a result, the charge and discharge efficiency of the battery 3000 can be improved.

For example, the second electrolyte layer 302 may include a sulfide solid electrolyte. Here, the reduction potential of the sulfide solid electrolyte included in the second electrolyte layer 302 is lower than the reduction potential of the solid electrolyte material included in the first electrolyte layer 301. With the above configuration, the solid electrolyte material included in the first electrolyte layer 301 can be used without being reduced. As a result, the charge and discharge efficiency of the battery 3000 can be improved.

The thickness of each of the first electrolyte layer 301 and the second electrolyte layer 302 may be 1 μm or more and 300 μm or less. In the case where the thickness of each of the first electrolyte layer 301 and the second electrolyte layer 302 is 1 μm or more, a short circuit between the positive electrode 201 and the negative electrode 203 is less likely to occur. In the case where the thickness of each of the first electrolyte layer 301 and the second electrolyte layer 302 is 300 μm or less, the battery 3000 can operate at a high power.

EXAMPLES

The present disclosure will be described below in more detail with reference to examples.

Example 1

[Production of First Solid Electrolyte Material]

In an argon glove box with a dew point of −60° C. or lower (hereinafter referred to as "in an argon atmosphere"), LiF, TiF$_4$, and MgF$_2$ were weighed as raw material powders at a molar ratio of LiF:TiF$_4$:MgF$_2$=3:0.5:0.5. Then, a planetary ball mill (Type P-5, manufactured by Fritsch GmbH) was used to perform a milling process at 200 rpm for 24 hours. Thus, a powder of Li$_3$Ti$_{0.5}$Mg$_{0.5}$F$_6$ was obtained as a first solid electrolyte material of Example 1.

[Production of Positive Electrode Active Material Whose Surface is Coated with First Solid Electrolyte Material]

In an argon atmosphere, Li(Ni, Co, Mn)O$_2$ (hereinafter referred to as NCM) which is a positive electrode active material and the first solid electrolyte material of Example 1 were weighed at a mass ratio of 100:3. These materials were put into a dry particle composing machine, NOBILTA (manufactured by Hosokawa Micron Corporation) and subjected to a compositing process at 6000 rpm for 30 minutes. Thus, a positive electrode active material whose surface is coated with the first solid electrolyte material was obtained.

[Production of Second Electrolyte Material]

In an argon atmosphere, raw material powders LiBr, YBr$_3$, LiCl, and YCl$_3$ were weighed at a molar ratio of LiBr:YBr$_3$:LiCl:YCl$_3$=1:1:5:1. Then, a planetary ball mill (Type P-7, manufactured by Fritsch GmbH) was used to perform a milling process at 600 rpm for 25 hours. Thus, a powder of Li$_3$YBr$_2$Cl$_4$ was obtained as a second electrolyte material. In addition, in Examples 2 to 4 and Comparative Example 1 below, Li$_3$YBr$_2$Cl$_4$ was used as the second electrolyte material.

[Production of Positive Electrode Material]

The positive electrode active material whose surface is coated with the first solid electrolyte material of Example 1 and the second electrolyte material Li$_3$YBr$_2$Cl$_4$ were weighed at a mass ratio of 81.55:18.45 and mixed in a mortar. Thus, a positive electrode material of Example 1 was produced.

Example 2

[Production of First Solid Electrolyte Material]

In an argon atmosphere, LiF, TiF$_4$, and CaF$_2$ were weighed as raw material powders at a molar ratio of LiF:TiF$_4$:CaF$_2$=3:0.5:0.5. Then, a planetary ball mill (Type P-7, manufactured by Fritsch GmbH) was used to perform a milling process at 500 rpm for 12 hours. Thus, a powder of Li$_3$Ti$_{0.5}$Ca$_{0.5}$F$_6$ was obtained as a first solid electrolyte material of Example 2.

[Production of Positive Electrode Active Material Whose Surface is Coated with First Solid Electrolyte Material]

In an argon atmosphere, NCM which is a positive electrode active material and the first solid electrolyte material of Example 2 were weighed at a mass ratio of 100:3. These materials were put into a dry particle composing machine, NOBILTA (manufactured by Hosokawa Micron Corporation) and subjected to a compositing process at 6000 rpm for 30 minutes. Thus, a positive electrode active material whose surface is coated with the first solid electrolyte material of Example 2 was obtained.

[Production of Positive Electrode Material]

The positive electrode active material whose surface is coated with the first solid electrolyte material of Example 2 and the second electrolyte material $Li_3YBr_2Cl_4$ were weighed at a mass ratio of 81.55:18.45 and mixed in a mortar. Thus, a positive electrode material of Example 2 was produced.

Example 3

[Production of First Solid Electrolyte Material]

In an argon atmosphere, LiF, $TiF_4$, and $AlF_3$ were weighed as raw material powders at a molar ratio of LiF:$TiF_4$:$AlF_3$=2.6:0.4:0.6. Then, a planetary ball mill (Type P-7, manufactured by Fritsch GmbH) was used to perform a milling process at 500 rpm for 12 hours. Thus, a powder of $Li_{2.6}Ti_{0.4}Al_{0.6}F_6$ was obtained as a first solid electrolyte material of Example 3.

[Production of Positive Electrode Active Material Whose Surface is Coated with First Solid Electrolyte Material]

In an argon atmosphere, NCM which is a positive electrode active material and the first solid electrolyte material of Example 3 were weighed at a mass ratio of 100:3. These materials were put into a dry particle composing machine, NOBILTA (manufactured by Hosokawa Micron Corporation) and subjected to a compositing process at 6000 rpm for 30 minutes. Thus, a positive electrode active material whose surface is coated with the first solid electrolyte material of Example 3 was obtained.

[Production of Positive Electrode Material]

The positive electrode active material whose surface is coated with the first solid electrolyte material of Example 3 and the second electrolyte material $Li_3YBr_2Cl_4$ were weighed at a mass ratio of 81.55:18.45 and mixed in a mortar. Thus, a positive electrode material of Example 3 was produced.

Example 4

[Production of First Solid Electrolyte Material]

In an argon atmosphere, LiF, $TiF_4$, and $ZrF_4$ were weighed as raw material powders at a molar ratio of LiF:$TiF_4$:$ZrF_3$=3:0.5:0.5. Then, a planetary ball mill (Type P-5, manufactured by Fritsch GmbH) was used to perform a milling process at 200 rpm for 24 hours. Thus, a powder of $Li_3Ti_{0.5}Zr_{0.5}F_7$ was obtained as a first solid electrolyte material of Example 4.

[Production of Positive Electrode Active Material Whose Surface is Coated with First Solid Electrolyte Material]

In an argon atmosphere, NCM which is a positive electrode active material and the first solid electrolyte material of Example 4 were weighed at a mass ratio of 100:3. These materials were put into a dry particle composing machine, NOBILTA (manufactured by Hosokawa Micron Corporation) and subjected to a compositing process at 6000 rpm for 30 minutes. Thus, a positive electrode active material whose surface is coated with the first solid electrolyte material of Example 4 was obtained.

[Production of Positive Electrode Material]

The positive electrode active material whose surface is coated with the first solid electrolyte material of Example 4 and the second electrolyte material $Li_3YBr_2Cl_4$ were weighed at a mass ratio of 81.55:18.45 and mixed in a mortar. Thus, a positive electrode material of Example 4 was produced.

Comparative Example 1

[Production of Positive Electrode Material]

The positive electrode active material NCM and the second electrolyte material $Li_3YBr_2Cl_4$ were weighed at a mass ratio of 81.55:18.45 and mixed in a mortar. Thus, a positive electrode material of Comparative Example 1 was produced.

[Production of Battery]

Respective batteries were produced by using the positive electrode materials of Examples 1 to 4 and Comparative Example 1 described above through the following steps.

First, in an insulating outer cylinder, 60 mg of $Li_3YBr_2Cl_4$ was put and pressure-molded at a pressure of 80 MPa. The second electrolyte material produced in Example 1 was used as $Li_3YBr_2Cl_4$.

Next, 17.2 mg of the positive electrode material was put and pressure-molded at a temperature of 150° C. and a pressure of 300 MPa. Thus, a stack composed of a positive electrode and a solid electrolyte layer was obtained.

Next, on one side of the solid electrolyte layer opposite to the other side in contact with the positive electrode, metal In, metal Li, metal In, metal In, metal Li, and metal In were stacked in this order. The metal In used had a thickness of 200 μm, and the metal Li used had a thickness of 200 μm. These stacked metals were pressure-molded at a pressure of 80 MPa to produce a stack composed of the positive electrode, the solid electrolyte layer, and a negative electrode.

Next, stainless steel current collectors were placed on the top and the bottom of the stack, and current collector lead were attached to the current collectors.

Finally, an insulating ferrule was used to block the inside of the insulating outer cylinder from the outside air atmosphere and seal the insulating outer cylinder. Thus, a battery was produced.

In this way, the respective batteries of Examples 1 to 4 and Comparative Example 1 described above were produced.

Example 5

[Production of Second Electrolyte Material]

In an argon atmosphere, $Li_2S$ and $P_2S_5$ were weighed at a molar ratio of $Li_2S$:$P_2S_5$=75:25. These were pulverized in a mortar for mixing. Then, a planetary ball mill (Type P-7, manufactured by Fritsch GmbH) was used to perform a milling process at 510 rpm for 10 hours. Thus, a glassy solid electrolyte was obtained. The glassy solid electrolyte was heat-treated at 270° C. for 2 hours in an inert atmosphere. Thus, a second electrolyte material $Li_2S$—$P_2S_5$, which is a glass-ceramic solid electrolyte, was obtained. In addition, in Examples 6 to 8 and Comparative Example 2 below, $Li_2S$—$P_2S_5$ was used as the second electrolyte material.

[Production of Positive Electrode Material]

The positive electrode active material whose surface is coated with the first solid electrolyte material of Example 1 and the second electrolyte material $Li_2S$—$P_2S_5$ were weighed at a mass ratio of 81.2:18.8 and mixed in a mortar. Thus, a positive electrode material of Example 5 was produced.

Example 6

[Production of Positive Electrode Material]

The positive electrode active material whose surface is coated with the first solid electrolyte material of Example 2 and the second electrolyte material $Li_2S$—$P_2S_5$ were weighed at a mass ratio of 81.2:18.8 and mixed in a mortar. Thus, a positive electrode material of Example 6 was produced.

Example 7

[Production of Positive Electrode Material]

The positive electrode active material whose surface is coated with the first solid electrolyte material of Example 3 and the second electrolyte material $Li_2S$—$P_2S_5$ were weighed at a mass ratio of 81.2:18.8 and mixed in a mortar. Thus, a positive electrode material of Example 7 was produced.

Example 8

[Production of Positive Electrode Material]

The positive electrode active material whose surface is coated with the first solid electrolyte material of Example 4 and the second electrolyte material $Li_2S$—$P_2S_5$ were weighed at a mass ratio of 81.2:18.8 and mixed in a mortar. Thus, a positive electrode material of Example 8 was produced.

Comparative Example 2

[Production of Positive Electrode Material]

The positive electrode active material NCM and the second electrolyte material $Li_2S$—$P_2S_5$ were weighed at a mass ratio of 81.2:18.8 and mixed in a mortar. Thus, a positive electrode material of Comparative Example 2 was produced.

[Production of Battery]

Respective batteries were produced by using the positive electrode materials of Examples 5 to 8 and Comparative Example 2 described above through the following steps.

First, in an insulating outer cylinder, 96 mg of $Li_2S$—$P_2S_5$ was put and pressure-molded at a pressure of 80 MPa. The second electrolyte material produced in Example 5 was used as $Li_2S$—$P_2S_5$.

Next, 17.76 mg of a positive electrode was put and pressure-molded at a pressure of 700 MPa. Thus, a stack composed of a positive electrode and a solid electrolyte layer was obtained.

Next, on one side of the solid electrolyte layer opposite to the other side in contact with the positive electrode, metal In, metal Li, metal In, metal In, metal Li, and metal In were stacked in this order. The metal In used had a thickness of 200 μm, and the metal Li used had a thickness of 200 μm. These stacked metals were pressure-molded at a pressure of 80 MPa to produce a stack composed of the positive electrode, the solid electrolyte layer, and a negative electrode.

Next, stainless steel current collectors were placed on the top and the bottom of the stack, and current collector lead were attached to the current collectors.

Finally, an insulating ferrule was used to block the inside of the insulating outer cylinder from the outside air atmosphere and seal the insulating outer cylinder. Thus, a battery was produced.

In this way, the respective batteries of Examples 5 to 8 and Comparative Example 2 described above were produced.

[Charge Test]

A charge test was performed by using the respective batteries of Examples 1 to 8 and Comparative Examples 1 and 2 described above under the following conditions.

The battery was placed in a thermostatic chamber at 85° C.

Constant-current charge was performed at a current value of 140 μA at 0.05 C rate (20-hour rate) with respect to the theoretical capacity of the battery. The end-of-charge voltage was set to a voltage of 3.68 V (4.3 V vs. Li/Li$^+$). Next, constant-voltage charge was performed at a voltage of 3.68 V (4.3 V vs. Li/Li$^+$). The end-of-charge current was set to a current value of 28 μA at 0.01 C rate (100-hour rate).

Next, the battery was stored in a thermostatic chamber at 85° C. for 72 hours.

Next, AC impedance analysis was performed on the battery after storage. The voltage amplitude was set to ±10 mV and the frequency was set to $10^7$ to $10^{-2}$ Hz. The measurement was performed with an electrochemical measurement system manufactured by Solartron Analytical. A semicircular arc waveform appearing in the obtained Nyquist diagram is attributed to the resistance of the positive electrode and the resistance of In which is the negative electrode. Accordingly, fitting analysis was performed on the semicircular arc waveform appearing in the Nyquist diagram to calculate the resistance value of the positive electrode.

Table 1 shows the respective resistance values of the positive electrodes of Examples 1 to 8 and Comparative Examples 1 and 2.

TABLE 1

| | First solid electrolyte material | Second electrolyte material | Resistance value of positive electrode (Ω) |
|---|---|---|---|
| Example 1 | $Li_3Ti_{0.5}Mg_{0.5}F_6$ | $Li_3YBr_2Cl_4$ | 13.0 |
| Example 2 | $Li_3Ti_{0.5}Ca_{0.5}F_6$ | $Li_3YBr_2Cl_4$ | 40.3 |
| Example 3 | $Li_{2.6}Ti_{0.4}Al_{0.6}F_6$ | $Li_3YBr_2Cl_4$ | 9.6 |
| Example 4 | $Li_3Ti_{0.5}Zr_{0.5}F_7$ | $Li_3YBr_2Cl_4$ | 47.9 |
| Comparative Example 1 | Not included | $Li_3YBr_2Cl_4$ | 72.2 |
| Example 5 | $Li_3Ti_{0.5}Mg_{0.5}F_6$ | $Li_2S$—$P_2S_5$ | 5.8 |
| Example 6 | $Li_3Ti_{0.5}Ca_{0.5}F_6$ | $Li_2S$—$P_2S_5$ | 25.7 |
| Example 7 | $Li_{2.6}Ti_{0.4}Al_{0.6}F_6$ | $Li_2S$—$P_2S_5$ | 1.2 |
| Example 8 | $Li_3Ti_{0.5}Zr_{0.5}F_7$ | $Li_2S$—$P_2S_5$ | 54.6 |
| Comparative Example 2 | Not included | $Li_2S$—$P_2S_5$ | 356 |

DISCUSSION

According to Table 1, the battery of Example 1 exhibits a low resistance of the positive electrode. The reasons are as follows; since the first solid electrolyte material having high oxidation resistance coats at least partially the surface of the positive electrode active material, a contact between the positive electrode active material and $Li_3YBr_2Cl_4$, which is the second electrolyte material, is suppressed, so that an increase in resistance of the positive electrode is suppressed. In contrast, as indicated by the results of Comparative Example 1, the battery, which was formed using the positive electrode material including the positive electrode active material whose surface is not coated with the first solid electrolyte material, exhibits a high resistance value of 72.2Ω. The reasons are as follows; since the halide solid electrolyte $Li_3YBr_2Cl_4$, which is the second electrolyte material, is oxidatively decomposed by charge of the battery, the oxidative decomposition product functions as a resistance layer, so that the resistance of the positive electrode increases.

As indicated by the results of Examples 2 to 4, even in the case where M1 included in the first solid electrolyte material is Ca, Al, or Zr, a low resistance of the positive electrode can be exhibited as in Example 1.

As indicated by the results of Examples 5 to 8, even in the case where the second electrolyte material is the sulfide solid electrolyte Li$_2$S—P$_2$S$_5$, a low resistance of the positive electrode can be achieved as in Examples 1 to 4. In contrast, as indicated by the results of Comparative Example 2, as in Comparative Example 1, the battery, which was formed using the positive electrode material including the positive electrode active material whose surface is not coated with the first solid electrolyte material, exhibits a high resistance of the positive electrode.

As indicated by the above examples, according to the present disclosure, it is possible to suppress an increase in internal resistance of a battery during charge.

INDUSTRIAL APPLICABILITY

The battery of the present disclosure can be utilized, for example, as an all-solid-state lithium-ion secondary battery.

What is claimed is:

1. A positive electrode material comprising:
a positive electrode active material; and
a first solid electrolyte material coating at least partially a surface of the positive electrode active material, wherein
the first solid electrolyte material includes Li, Ti, M1, and F,
the M1 is at least one element selected from the group consisting of Ca, Mg, Al, Y, and Zr, and
the first solid electrolyte material satisfies the following a), b), or c):
a) the first solid electrolyte material includes a material represented by the following composition formula (1), $$Li_{6-(4-2x1)b1}(Ti_{1-x1}M1_{x1})_{b1}F_6 \quad \text{Formula (1)}$$

where 0<x1<1 and 0<b1≤3 are satisfied,
b) the first solid electrolyte material includes a material represented by the following composition formula (2), $$Li_{6-(4-x2)b2}(Ti_{1-x2}M1_{x2})_{b2}F_6 \quad \text{Formula (2)}$$

where 0<x2<1 and 0<b2≤1.5 are satisfied, or
c) the first solid electrolyte material includes Li$_3$Ti$_{0.5}$Zr$_{0.5}$F$_7$.

2. The positive electrode material according to claim 1, wherein
the first solid electrolyte material satisfies the a), and
the M1 includes at least one element selected from the group consisting of Mg and Ca.

3. The positive electrode material according to claim 2, wherein
the first solid electrolyte material includes Li$_3$Ti$_{0.5}$Mg$_{0.5}$F$_6$.

4. The positive electrode material according to claim 2, wherein
the first solid electrolyte material includes Li$_3$Ti$_{0.5}$Ca$_{0.5}$F$_6$.

5. The positive electrode material according to claim 1, wherein
the first solid electrolyte material satisfies the b), and
the M1 includes at least one element selected from the group consisting of Al and Y.

6. The positive electrode material according to claim 5, wherein
the first solid electrolyte material includes Li$_{2.6}$Ti$_{0.4}$Al$_{0.6}$F$_6$.

7. The positive electrode material according to claim 1, wherein
the first solid electrolyte material satisfies the a) or b), and
the M1 includes Al and at least one element selected from the group consisting of Mg and Zr.

8. The positive electrode material according to claim 1, further comprising
a second electrolyte material that is a material different from the first solid electrolyte material.

9. The positive electrode material according to claim 8, wherein
the second electrolyte material is represented by the following composition formula (5), $$Li_\alpha M2_\beta X_\gamma \quad \text{Formula (5)}$$

where α, β, and γ are each a value greater than 0,
the M2 includes at least one of a metalloid element and a metal element other than Li, and
the X is at least one element selected from the group consisting of F, Cl, Br, and I.

10. The positive electrode material according to claim 9, wherein
the M2 includes Y.

11. The positive electrode material according to claim 9, wherein
the composition formula (5) satisfies:

$$2.5 \le \alpha \le 3;$$

$$1 \le \beta \le 1.1; \text{ and}$$

$$\gamma = 6.$$

12. The positive electrode material according to claim 8, wherein
the second electrolyte material includes a sulfide solid electrolyte.

13. The positive electrode material according to claim 12, wherein
the sulfide solid electrolyte includes lithium sulfide and phosphorus sulfide.

14. The positive electrode material according to claim 12, wherein
the sulfide solid electrolyte is Li$_2$S—P$_2$S$_5$.

15. The positive electrode material according to claim 8, wherein
the second electrolyte material is an electrolyte solution including a lithium salt and a solvent.

16. The positive electrode material according to claim 1, wherein
the positive electrode active material includes lithium nickel cobalt manganese oxide.

17. The positive electrode material according to claim 8, wherein
the first solid electrolyte material is provided between the positive electrode active material and the second electrolyte material.

18. A battery comprising:
a positive electrode including the positive electrode material according to claim 1;
a negative electrode; and
an electrolyte layer disposed between the positive electrode and the negative electrode.

19. The battery according to claim 18, wherein
the positive electrode material further includes a second electrolyte material that is a material different from the first solid electrolyte material, and the electrolyte layer includes a material that is the same as the first solid electrolyte material or the same as the second electrolyte material.

20. The battery according to claim 19, wherein the electrolyte layer includes the material that is the same as the first solid electrolyte material.

21. The battery according to claim 18, wherein the electrolyte layer includes a first electrolyte layer and a second electrolyte layer, and
the first electrolyte layer is in contact with the positive electrode, and the second electrolyte layer is in contact with the negative electrode.

22. The battery according to claim 21, wherein the first electrolyte layer includes a material that is the same as the first solid electrolyte material.

23. The battery according to claim 21, wherein the second electrolyte layer includes a material that is different from the first solid electrolyte material.

* * * * *